United States Patent
Suzuki et al.

(10) Patent No.: US 10,036,301 B2
(45) Date of Patent: Jul. 31, 2018

(54) ENGINE EXTERIOR BODY

(71) Applicant: Yamabiko Corporation, Tokyo (JP)

(72) Inventors: Kenji Suzuki, Hiroshima (JP); Taiji Matsubara, Hiroshima (JP); Tomohiro Ohtsubo, Tokyo (JP); Ayato Oimatsu, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 48 days.

(21) Appl. No.: 15/300,300

(22) PCT Filed: Jan. 9, 2015

(86) PCT No.: PCT/JP2015/050477
§ 371 (c)(1),
(2) Date: Sep. 29, 2016

(87) PCT Pub. No.: WO2015/156006
PCT Pub. Date: Oct. 15, 2015

(65) Prior Publication Data
US 2017/0184010 A1    Jun. 29, 2017

(30) Foreign Application Priority Data
Apr. 11, 2014   (JP) ................................ 2014-082343

(51) Int. Cl.
*F01P 5/04*   (2006.01)
*F01D 5/02*   (2006.01)
(Continued)

(52) U.S. Cl.
CPC   *F01P 5/04* (2013.01); *F01P 1/06* (2013.01); *F01P 5/06* (2013.01)

(58) Field of Classification Search
CPC ... F01D 25/24; F01D 5/02; F01P 11/12; F01P 5/06
See application file for complete search history.

(56) References Cited

U.S. PATENT DOCUMENTS 2,661,810 A * 12/1953 Heth ..................... F02M 35/08
                                                          55/301
2,671,386 A *  3/1954 Kerridge .............. E01C 19/283
                                                          172/40
(Continued)

FOREIGN PATENT DOCUMENTS

| JP | S48-021025 | 7/1946 |
|----|-----------|--------|
| JP | H05-018594 | 3/1993 |

(Continued)

OTHER PUBLICATIONS

International Search Report issued in International (PCT) Patent Application No. PCT/JP2015/050477 (dated Mar. 31, 2015).
(Continued)

*Primary Examiner* — Long T Tran
(74) *Attorney, Agent, or Firm* — Reising Ethington P.C.

(57) ABSTRACT

To provide an exterior body to attach to an engine body, where the exterior body is not limited to where it may be installed, is safe and has excellent dust proofing capability. An engine exterior body (2) is provided with a frame body (20) configured to attach to an engine body (1); a shaft part (21) projecting from the surface of the frame body (20); and a rotator body (22) including a hole part (22a) loosely fitted and retained on the shaft part (21). The rotator body (22) rotates about the shaft part (21) by way of the vibrations transmitted to the shaft part (21) when engine body operates without receiving power from the engine body (1).

6 Claims, 4 Drawing Sheets

(51) Int. Cl.
*F01P 1/06* (2006.01)
*F01P 5/06* (2006.01)

(56) References Cited

U.S. PATENT DOCUMENTS

| | | | | |
|---|---|---|---|---|
| 2,729,518 | A * | 1/1956 | O'Connor | F16C 27/04 |
| | | | | 188/268 |
| 3,475,883 | A * | 11/1969 | Sullivan | F01P 11/12 |
| | | | | 55/290 |
| 4,439,218 | A * | 3/1984 | Priepke | B01D 46/10 |
| | | | | 55/282.4 |
| 5,975,862 | A * | 11/1999 | Arahata | B25F 5/006 |
| | | | | 417/234 |
| 7,055,213 | B2 * | 6/2006 | Iida | A47L 5/14 |
| | | | | 15/405 |
| 8,277,528 | B2 * | 10/2012 | Umemoto | A01D 34/82 |
| | | | | 55/385.3 |

FOREIGN PATENT DOCUMENTS

| | | |
|---|---|---|
| JP | H08-068326 | 3/1996 |
| JP | 2008-196356 | 8/2008 |

OTHER PUBLICATIONS

English language translation of International Search Report issued in International (PCT) Patent Application No. PCT/JP2015/050477 (dated Mar. 31, 2015).
Written Opinion issued in International (PCT) Patent Application No. PCT/JP2015/050477 (dated Mar. 31, 2015).
English language translation of Written Opinion issued in International (PCT) Patent Application No. PCT/JP2015/050477 (dated Mar. 31, 2015).
English language abstract of JP S48-021025.
English language translation of JP H05-018594.
English language translation of JP H08-068326.
English language translation of JP 2008-196356.

* cited by examiner

X-X cross-section

ENGINE EXTERIOR BODY

This application is the national stage application of International Application No. PCT/JP2015/050477 filed Jan. 9, 2015, the entire disclosure of which is incorporated herein by reference and which claims priority to Japanese Patent Application No. 2014-082343 filed Apr. 11, 2014, the entire disclosure of which is incorporated herein by reference.

TECHNICAL FIELD

The present invention relates to an engine exterior body attached to an engine body.

BACKGROUND

Internal combustion takes place in the engine body, which is the part of the engine that contains the air intake and air discharge sections, and the piston cylinders. The internal combustion process heats the engine body, and therefore an exterior body, such as a cover, is generally attached to the engine to prevent someone from touching the engine body directly. Rotation of the crankshaft drives the drive wheel (drive pulley); and the exterior body may be equipped to also cover the drive wheel and the cooling fan to prevent a person from touching these components directly.

The following Patent Document 1 discloses a fan cover, which is one of the above types of exterior body. In conventional art, the entire surface of the cooling air intake on the fan cover is provided with a dustproof body that rotates, or that reciprocates across the entire cooling air intake. The dustproof body rotates at a high speed together with the cooling fan provided inside the fan cover, to prevent debris from clogging the cooling air intake.

CITATION LIST

Patent Documents

Patent Document 1: Japanese Utility Model Publication No. 48-21025

SUMMARY

Technical Problem

Work engines, such as lawn mower engines, can be negatively affected by debris deposited on the exterior body attached to the engine body. For instance, debris deposited on the cover of the cooling fan blocks the intake of cooling air, and debris deposited around the air cleaner connected to the carburetor prompts frequent maintenance. An effective method of dealing with such dust deposition is to provide a conventional dustproof body and to have the dustproof body rotating. However, if the dustproof body rotates via the power transmitted from the engine output as conventional art, the dustproof body can only be attached in certain places. The dustproof body would also be rotating outside the cover at the same high speed as the cooling fan, rendering the cover useless as a safety measure. Moreover, a portion of the engine output would also be used to drive the dustproof body.

Of course, temperature increases in the components of the engine body must be kept under control when the engine operates over long periods of time. A hot carburetor in particular leads to deteriorated startup performance when the engine restarts; therefore, such temperature increases should be avoided as much as possible. Thus, an exterior body configured to attach to the engine body should provide improved heat dissipation.

This is an example of one of the problems the invention aims to address. That is, the invention aims to provide an exterior body configured to attach to an engine body that is not limited to where it may be attached. This exterior body is safe, and has excellent dust proofing and heat dissipation capabilities.

Solution to Problem

To achieve these objectives, the engine exterior body of the present invention has following configurations described in this specification.

An engine exterior body is provided with a frame body configured to attach to an engine body; a shaft part configured to project from the surface of the frame body; and a rotator body including a hole part loosely fitted and retained on the shaft part. The rotator body rotates about the shaft part due to the vibrations transmitted to the shaft part when engine body operates and without receiving power transmission from the engine body.

Advantageous Effects of Invention

An engine exterior body with these features is provided with a rotator body that rotates due to the vibrations in the engine body; therefore, the rotator body rotates when the engine body is operating regardless of where the rotator body is attached, thereby providing improved dustproofing capabilities. The rotator body is produced from a high thermal conductivity material, and is thereby capable of effectively dissipating heat as it rotates when the engine operates. Finally, there is no output loss because the rotator body rotates without receiving power transmission from the engine; additionally, safety is still guaranteed because the rotator body, which can be stopped when touched without great resistance, can be provided outside a cover.

BRIEF DESCRIPTION OF DRAWINGS

FIG. 2(a) is a vertical cross section; FIG. 2(b) is a plan view; and, FIGS. 2(c) to 2(e) are cross-sectional views of X-X;

DESCRIPTION OF EMBODIMENTS

Figure 1:
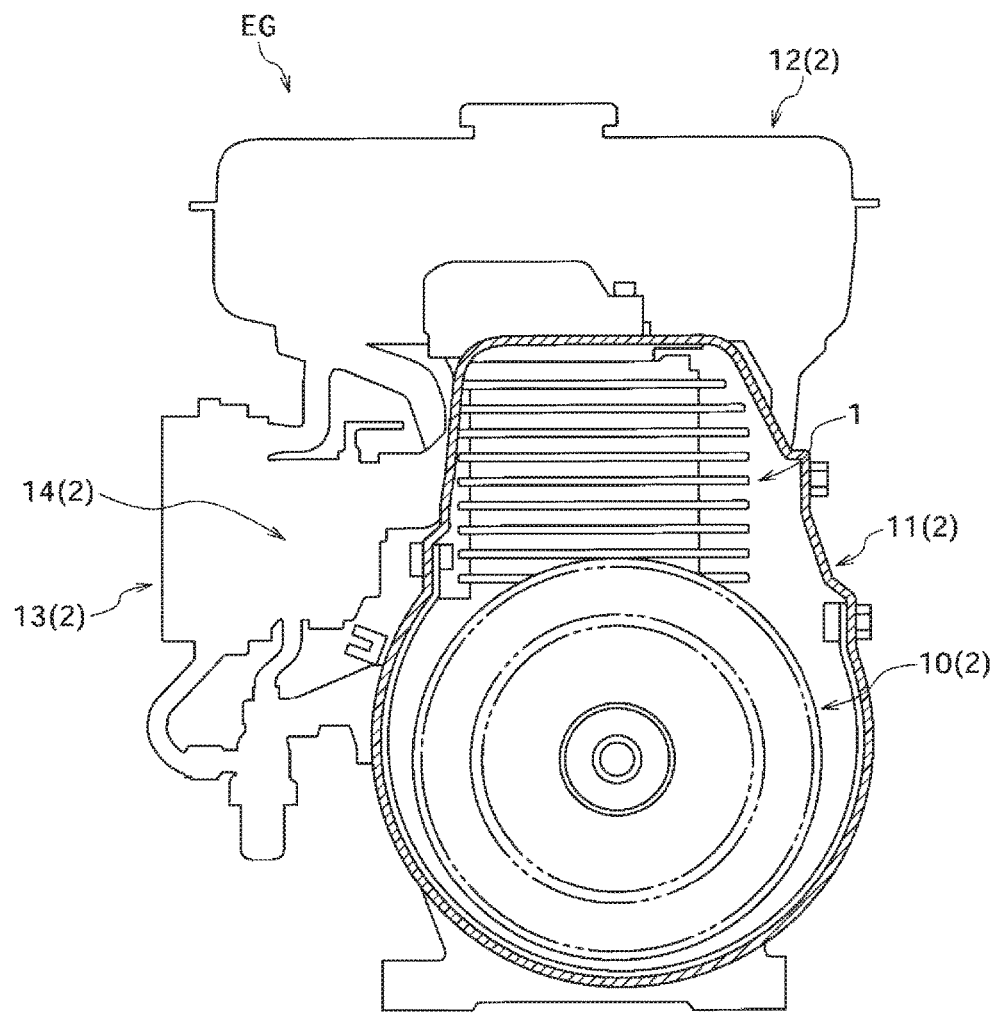
FIG. 1 is for describing the typical configuration of an engine.
Figure 2A:
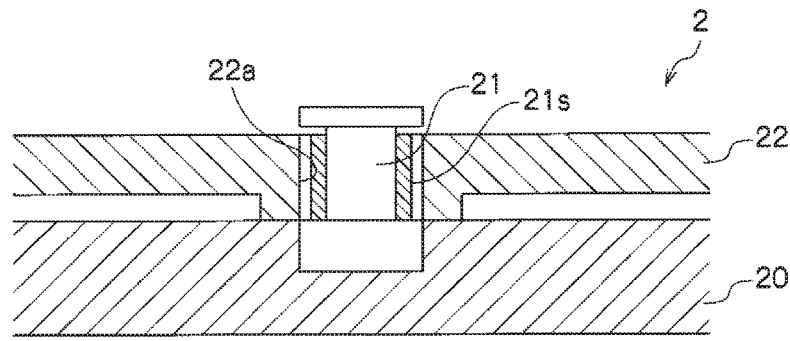
FIGS. 2(a) to 2(e) are for describing the components in an engine exterior body according to an embodiment of the invention.
Figure 2B:
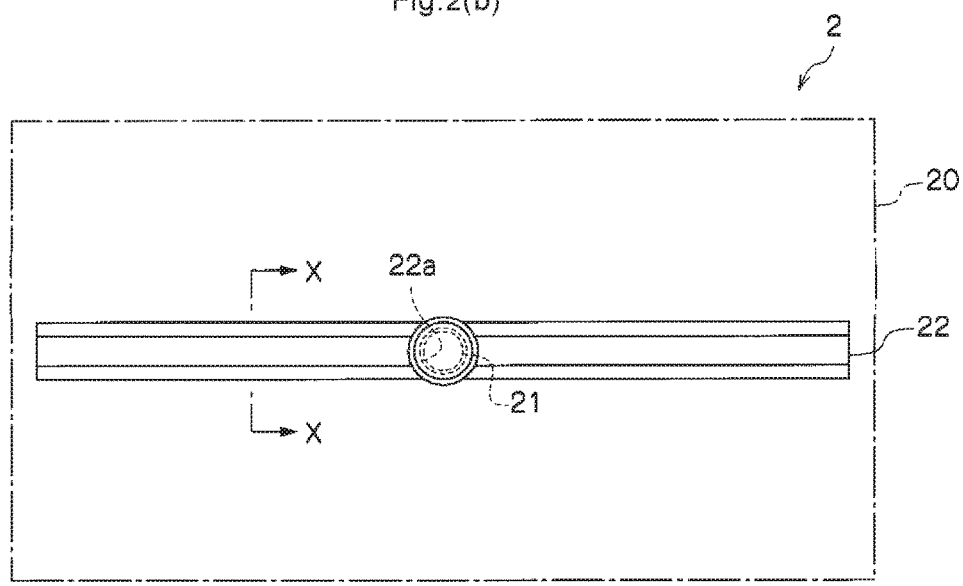
Figure 2C:
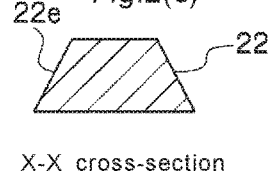
Figure 2D:
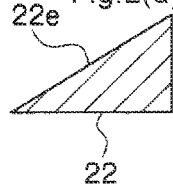
Figure 2E:
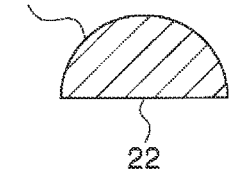

Embodiments of the invention are described below with reference to the drawings. FIG. 1 is a diagram for describing the typical configuration of an engine. An engine EG is configured as an engine body 1, and an engine exterior body 2 attached to the engine body 1. The engine body 1 is configured by a crank case and a cylinder head. The engine exterior body 2 discussed here typically refers to a cooling fan 10, a cover 11 covering the cooling fan 10, a fuel tank 12, an air cleaner 13, and a carburetor 14 which are configured to attach to the engine body 1.

FIGS. 2(a) to 2(e) are for describing the components in an engine exterior body according to an embodiment of the invention. The engine exterior body 2 is provided with a frame body 20 configured to attach to the engine body (not shown), a shaft part 21 configured to project from the surface of the frame body 20, and a rotator body 22 including a hole part 22a loosely fitted and retained on the shaft part 21. A collar 21s is press fitted to the shaft part 21 to protect the shaft part 21, and the hole part 22a fits loosely around the collar 21s.

The hole part 22a in the rotator body 22 is loosely fitted and retained on the shaft part 21. Herewith, the vibrations transmitted to the shaft part 21 when the engine body 1 operates cause the rotator body 22 to rotate around the shaft part 21 without receiving power transmission from the engine body. The engine body must operate continuously in order for the rotator body 22 to rotate continuously. At this point, the rotator body 22 rotates due to the vibrations that occur when the engine body is operating, and not due to power from the rotation of the output shaft in the engine body, nor due to air pressure of the cooling air generated by the rotation of the cooling fan.

Vibrations generated in the engine body vibrate the frame body 20 attached to the engine body; this in turn vibrates the shaft part 21 provided projecting from the surface of the frame body 20, which finally causes the rotator body 22 to rotate. More specifically, the moving shaft part 21 strikes a part of the inner surface of the hole part 22a causing the rotator body 22 to rotate about the shaft part 21.

The inner diameter of the hole part 22a is larger than the outer diameter of the shaft part 21 where preferably, the dimensional ratio of the inner diameter of the hole part 22a to the outer diameter of the shaft part 21 is roughly 1.10 to 1.20. A hole part 22a with an overly-large inner diameter in relation to the outer diameter of the shaft part 21 tends to make it difficult for the movement of the shaft part 21 to be transmitted to the inner surface of the hole part 22a. Further, a hole part 22a with a too-small inner diameter in relation to the outer diameter of the shaft part 21 increases the friction between the periphery of the shaft part 21 and the inner surface of the hole part 22a. This tends to make it difficult to achieve some play in the rotation of the rotator body 22. The clearance between the outer diameter of the shaft part 21 and the inner surface of the hole part 22a can be used to adjust the rotation speed of the rotator body, and thus both dust proofing ability and safety may be considered to establish a suitable clearance.

The rotator body 22 in the engine exterior body 2 illustrated in FIG. 2 is configured as an a sheet of oblong member elongated in one direction. The rotator body 22 is axially supported by the shaft part 21 so that the rear side of the rotator body 22 does not rest on the surface of the frame body 20. Providing clearance between the rear side of the rotator body 22 and the surface of the frame body 20 in this manner ensures that the rotator body 22 rotates with little resistance. As an example, the rotator body 22 illustrated in FIG. 2 has a trapezoidal cross section (FIG. 2(c)). Given this kind of cross sectional shape, the side face 22e is a slanted face along and facing the rotating direction of the rotator body 22. Hereby, debris is easily dislodged along the slant face. The rotator body 22 may have a convex cross section such as the triangle illustrated in FIG. 2(d) or the curve illustrated in FIG. 2(e). The side face 22e facing the rotating direction of the above rotator body 22 is not limited to a linear slant, and may be curved along the rotating direction.

According to the embodiment, the engine exterior body 2 is provided with a rotator body 22 that rotates along the surface of the frame body 20 when the engine operates thereby preventing debris from depositing on the surface of the frame body 20. Thus, with the frame body 20 configured as the cooling air intake, the rotator body prevents debris from depositing to the cooling air intake, facilitating effective cooling and favorable engine performance when the engine operates over long periods.

According to the embodiment, the engine exterior body 2 can be attached at various locations on the engine body 1 because the engine exterior body 2 requires no engine drive power to rotate the rotator body 22, and effective dust proofing is achieved with the rotation of the rotator body 22. The rotator body 22, which vibrates with the vibrations in the engine body 1, stops rotating on contact without much resistance. Without contact, the rotator body 22 starts rotating again if the engine is still operating. Therefore, it is safe for the rotator body 2 to operate while exposed from the surface of the engine exterior body 2. Additionally, the rotator body 22 is not coupled to the engine in any way. Therefore, the rotator body 22 does not place an unnecessary load on the engine even when impeded by a foreign object wedged between the rotator body 22 and the frame body 20.

The rotator body 22 rotates along the surface of the engine exterior body 2 which can be attached at various locations on the engine body 1. Therefore, the rotator body 22 can radiate heat from the frame body 20 to the shaft part 21, and effectively radiate heat from locations on the hot engine body 1 and the frame body 20. The rotator body 22 itself glides through the air as it rotates, and therefore an engine exterior body 2 provided with the rotator body 22 has better heat radiating performance. The radiation effect can be further improved, particularly when the frame body 20, the shaft part 21, and the rotator body 22 are made of highly thermally conductive material such as aluminum.

Figure 3A:
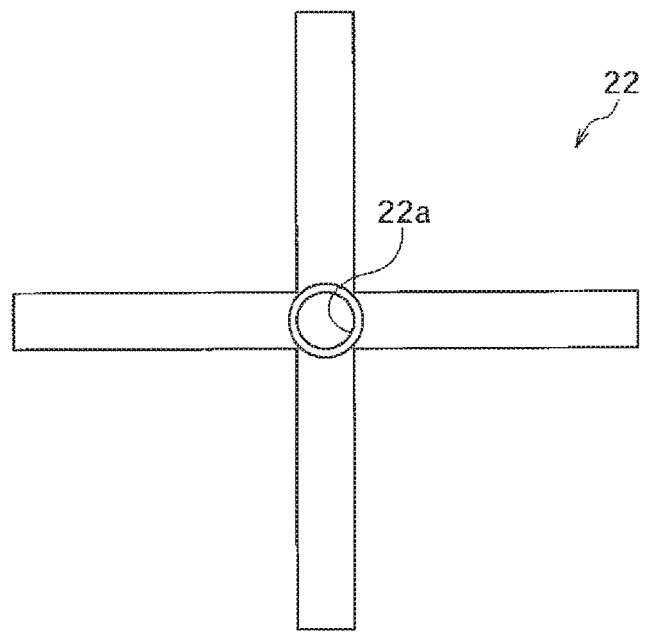
FIGS. 3(a) and 3(b) are for describing another embodiment of the rotator body of an engine exterior body according to an embodiment of the invention.
Figure 3B:
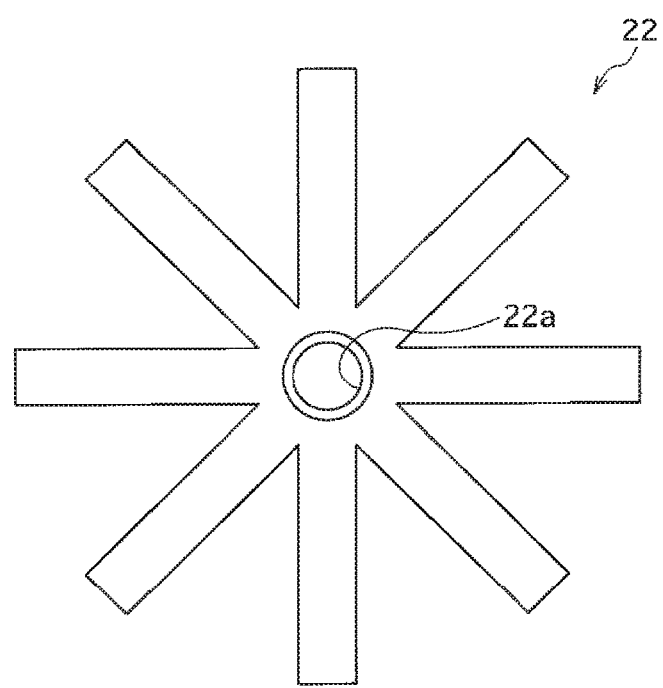

FIG. 3 is for describing another embodiment of the rotator body of an engine exterior body according to an embodiment. The rotator body 22 may be any shape if the hole part 22a is well balanced in relation to the rotator body 22. For instance, the hole part 22a may be provided so that the long sides of the rotator body emanate therefrom in four directions at 90° apart as illustrated in FIG. 3(a). Alternatively, the hole part 22a may be provided so that the long sides of the rotator body emanate therefrom in eight directions at equal intervals as illustrated in FIG. 3(b).

Figure 4A:
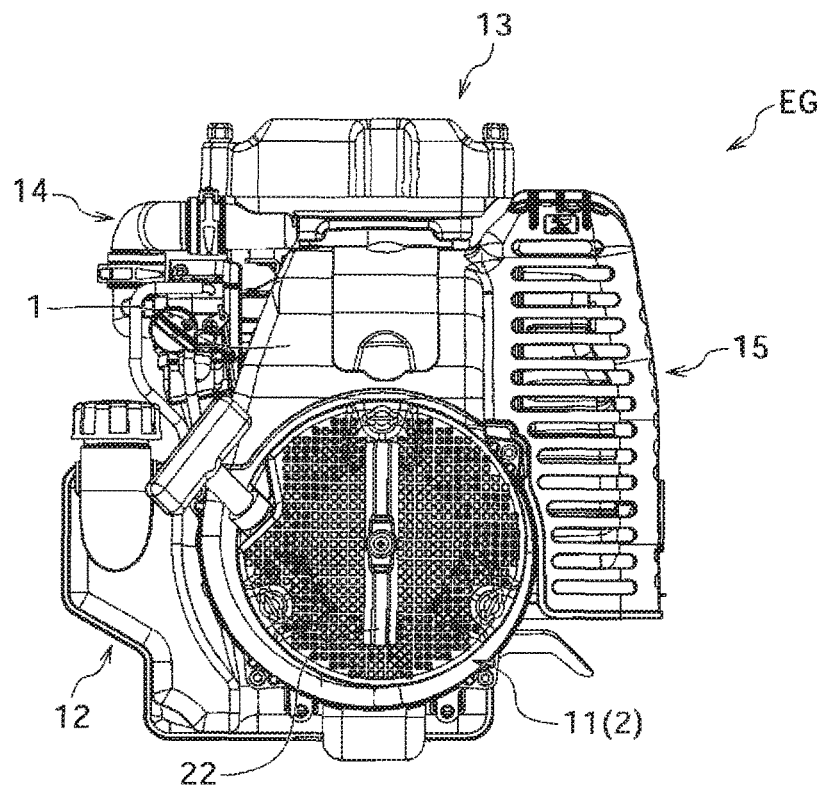
FIGS. 4(a) and 4(b) are for describing a specific example of an engine exterior body according to an embodiment of the invention.
Figure 4B:
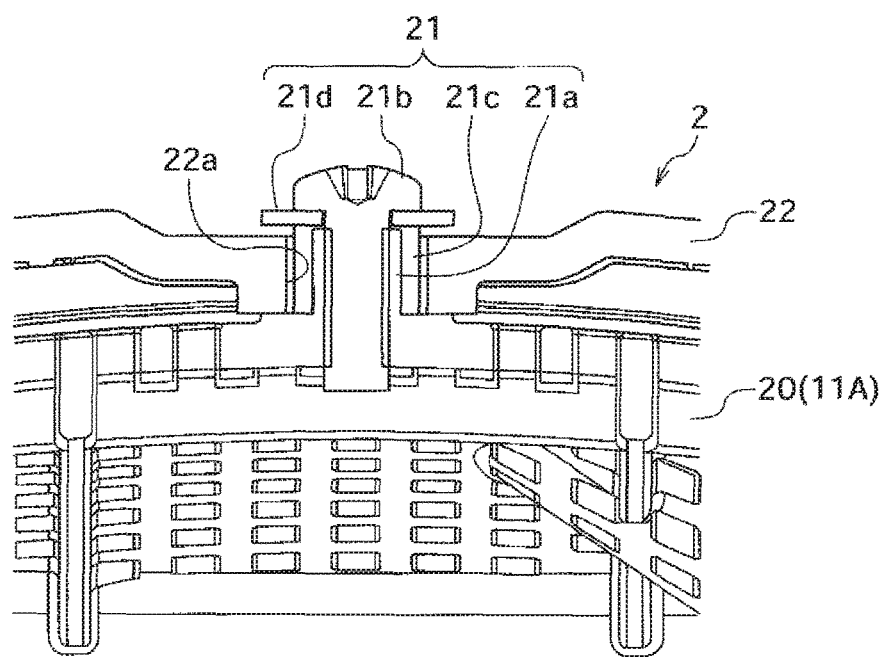

FIG. 4 is for describing a specific example of an engine exterior body according to an embodiment of the invention. FIG. 4(a) shows the engine exterior body attached to the engine body, and FIG. 4(b) shows the components of the engine exterior body. As illustrated in FIG. 4(a), the engine body 1 of the engine EG is provided with an engine exterior body configured as a cover 11, a fuel tank 12, an air cleaner 13, a carburetor 14, a muffler cover 15 (or muffler), and the like. In this example, the cover 11 of the engine exterior body 2 is provided with the rotator body 22.

The engine exterior body 2 is configured as a frame body 20 including a cooling air intake 11A and provided on the cover 11, and the shaft part 21 provided at roughly the center of the cooling air intake 11A. The shaft part 21 is made up of a molded part 21a molded to project from the cooling air intake 11A, a screw 21b screwed into the molded part 21a, a collar 21c surrounding the molded part 21a and the screw 21b, and a washer 21d. The hole part 22a in the rotator body 22 is loosely fitting while retained in the shaft part 21; and the shaft part 21 supports the rotator body 22 axially. Assume, for instance, that the rotator body 22 is 110 mm long, the shaft diameter of the shaft part 21 is 7.8 mm and the shaft length is 5.9 mm, and the inner diameter of the hole part 22a is 8.8 mm.

With an engine exterior body 2 configured as above, the rotator body 22 rotates along the surface of the cooling air intake 11A due to the vibrations transmitted to the shaft part 21 when the engine EG starts up and the engine body 1 operates. In this example, the number of rotations of the rotator body 22 increases in accordance with the number of rotations of the engine. More specifically, it was found that when the number of rotations of the engine gradually increased between 3000 to 6000 rpm, the number of rotations of the rotator body 22 gradually increased from 280 to 570 rpm. It was also found that debris hardly deposited on the cover 11 when an engine EG with this engine exterior body 2 was provided in a lawn mower. The cooling fan also continually provided satisfactory cooling performance.

Embodiments of the invention are described above with reference to the drawings; however, these embodiments are not limited to the specific configurations described; design modifications and the like that are within the scope of the technical concepts of the invention are considered a part of the invention. Each of the above described embodiments may be combined using the techniques taught herein insofar as there are no particular contradictions or problems arising from the combination with respect to the aims or configurations of the embodiments.

REFERENCE SIGNS LIST

1: Engine body, 2: Engine exterior body, 10: Cooling fan, 11: Cover, 12: Fuel tank, 13: Air cleaner, 14: Carburetor, 15: Muffler cover, 20: Frame body, 21: Shaft part, 22a: Hole part, 22: Rotator body, EG: Engine

The invention claimed is:

1. An engine exterior body comprising:
   a frame body configured to attach to an engine body;
   a shaft part configured to project from a surface of the frame body; and
   a rotator body including a hole part loosely fitted and retained on the shaft part, an inner diameter of the hole part sized relative to an outer diameter of the shaft part such that only a portion of the inner diameter of the hole part engages the outer diameter of the shaft part at any point in time, the rotator body rotating about the shaft part due to vibrations transmitted to the shaft part-when the engine body operates and without receiving power transmission from the engine body
   wherein the hole part is balanced in relation to the rotator body, the rotator body is axially supported by the shaft part so that a rear side of the rotator body does not rest on the surface of the frame body, and the shaft part strikes a part of an inner surface of the hole part causing the rotator body to rotate.

2. The engine exterior body according to claim 1, wherein the frame body is a cover that includes a cooling air intake which the engine body-equips; and the rotator body rotates along a surface of the cooling air intake of the cover.

3. The engine exterior body according to claim 1, wherein the rotator body is an oblong member with the hole part provided at the center.

4. The engine exterior body according to claim 1, wherein the rotator body is formed from high thermal conductivity material.

5. The engine exterior body according to claim 1, wherein a ratio of an inside diameter dimension of the hole part to an outside diameter dimension of the shaft part is 1.10 to 1.20.

6. The engine exterior body according to claim 1, wherein a side face of the rotator body facing a rotating direction is a slant face or a curved face along the rotating direction.

* * * * *